US011030174B1

(12) United States Patent
Hagerup

(10) Patent No.: US 11,030,174 B1
(45) Date of Patent: Jun. 8, 2021

(54) QUANTIZED TIME RANGE INDEXING FOR OUT OF ORDER EVENT COLLECTIONS

(71) Applicant: Amazon Technologies, Inc., Seattle, WA (US)

(72) Inventor: Erik Hagerup, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 15/957,849

(22) Filed: Apr. 19, 2018

(51) Int. Cl.
*G06F 16/00* (2019.01)
*G06F 7/00* (2006.01)
*G06F 16/22* (2019.01)
*G06F 16/23* (2019.01)
*G06F 16/2458* (2019.01)
*G06F 21/60* (2013.01)

(52) U.S. Cl.
CPC ...... *G06F 16/2246* (2019.01); *G06F 16/2379* (2019.01); *G06F 16/2477* (2019.01); *G06F 21/602* (2013.01)

(58) Field of Classification Search
CPC ............. G06F 16/2246; G06F 16/2379; G06F 16/2477; G06F 21/602
USPC ................................................. 707/692, 746
See application file for complete search history.

(56) References Cited

U.S. PATENT DOCUMENTS

| 2005/0010944 | A1* | 1/2005 | Wright | H04N 21/812 725/22 |
| 2005/0135135 | A1* | 6/2005 | Sharma | G11C 15/04 365/49.15 |
| 2006/0235878 | A1* | 10/2006 | Shipp | G06F 16/2228 |
| 2008/0056262 | A1* | 3/2008 | Singh | H04L 45/7457 370/392 |
| 2008/0133935 | A1* | 6/2008 | Elovici | H04L 63/08 713/193 |
| 2010/0198830 | A1* | 8/2010 | Stewart | G06F 16/24539 707/741 |
| 2014/0114995 | A1* | 4/2014 | Kelley | H04L 45/38 707/758 |
| 2015/0081717 | A1* | 3/2015 | Pidduck | G06F 16/38 707/741 |
| 2016/0337672 | A1* | 11/2016 | Lee | H04N 21/2381 |
| 2017/0371940 | A1* | 12/2017 | Chintakayala | G06F 16/254 |

* cited by examiner

Primary Examiner — Kuen S Lu
(74) Attorney, Agent, or Firm — Davis Wright Tremaine LLP

(57) ABSTRACT

A system receives a set of log data generated from one or more computing services. The system identifies a first timestamp and a second timestamp associated with a set of log data. The system generates an index by encoding the quantized first and second timestamps and identifies a prefix length between the first and second timestamps. The prefix length is then used as a basis to interweave the encoded bits associated with the first and second timestamps to generate an index value. The index value may then be used as a key in connection with the index to locate log data to satisfy a query request.

20 Claims, 9 Drawing Sheets

QUANTIZED TIME RANGE INDEXING FOR
OUT OF ORDER EVENT COLLECTIONS

BACKGROUND

Modern computer systems are frequently implemented with a large number of services, resources, modules, and applications that operate collectively on a number of host computer systems within a computing resource service provider environment. As the number of services, resources, modules, and applications grow, it becomes increasing complex to track and maintain such entities. One approach to aid in the tracking and maintenance of these entities is to provide logging functionality such that each of the services, resources, modules, and applications are able to send log event notifications to one or more logging services associated with the computing resource service provider environment. The logging services can then use these log events to, for example, schedule maintenance, prioritize system configuration changes, detect operational issues, and/or perform other activities. However, as the number of services, resources, modules, and applications increases, the number of log entries corresponding to the log events increases accordingly. Additionally, in some systems, log entries may be collected long after they were generated and log entries may be received in an order different from the order in which they were generated. Thus, searching through a large corpus of log entries for a particular log event becomes very complex. In other words, the ability to quickly search and identify a particular log event or a particular time range of log events becomes difficult with large amount of entries. As a result, this could lead to, for instance, system failures, losses of communications, and security vulnerabilities.

BRIEF DESCRIPTION OF THE DRAWINGS

Various techniques will be described with reference to the drawings, in which.

DETAILED DESCRIPTION

Figure 1:
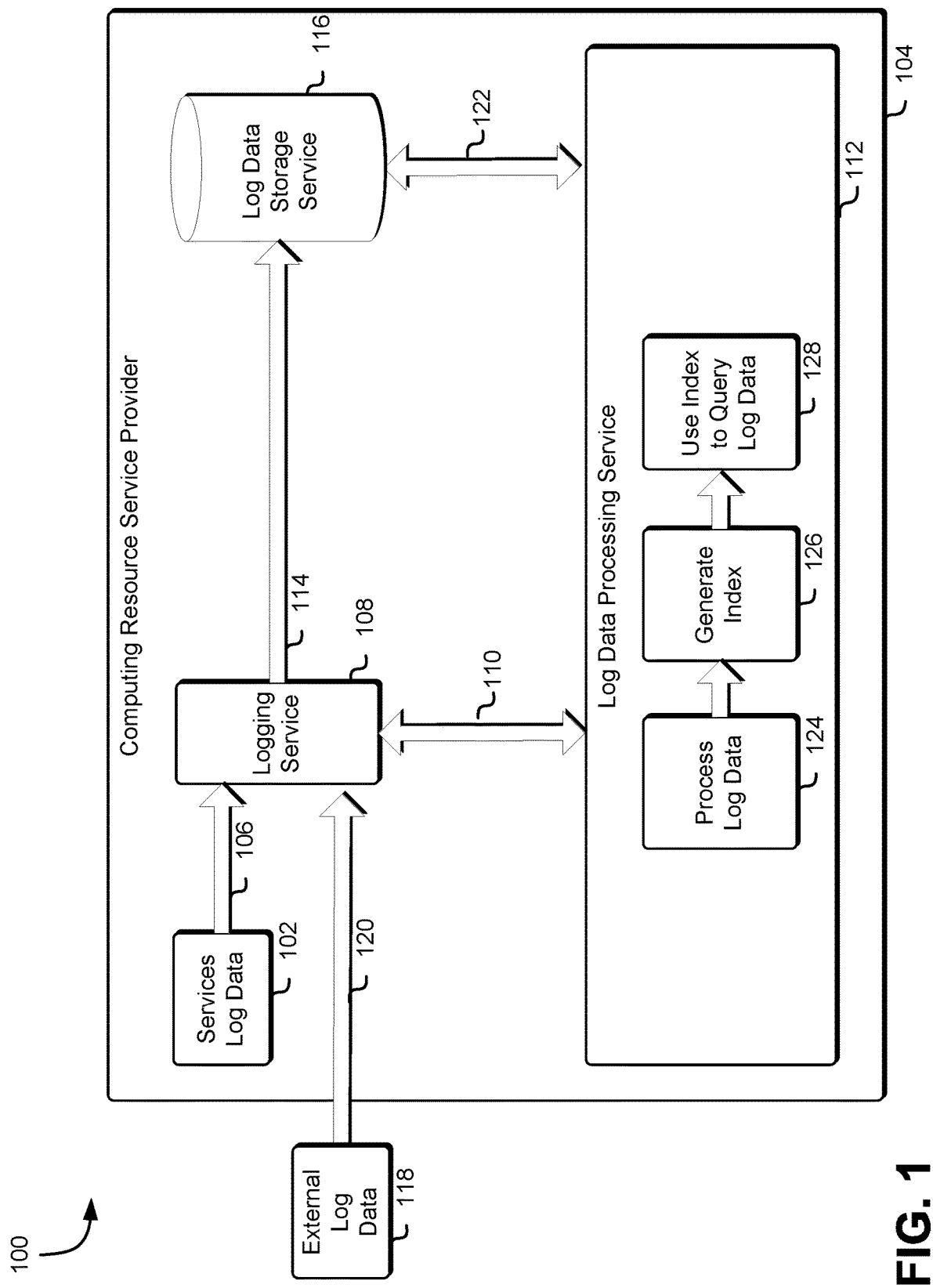
FIG. 1 illustrates a system in which one embodiment of receiving a set of log data and indexing the set of log data accordingly may be practiced.

The present document describes receiving a set of log data generated from one or more computing services and generating an index for the set of log data. Each log data has a timestamp that represents a time that the log data was generated by a computing service and each log data may be grouped into subsets or chunks based on these timestamps. Accordingly, when a subset of the set of log data (e.g., chunk) is received, a first timestamp (e.g., a beginning timestamp) and a second timestamp (e.g., an end timestamp) of the subset of the set of log data are identified. The respective bits associated with the first and second timestamps are encoded and further processed such that the encoded bits are interwoven with one another. Prior to the encoded bits being interwoven, however, a maximum prefix length of encoded bits associated with the first timestamp and the second timestamp are first determined. Specifically, the maximum prefix length is determined by identifying the number of encoded bits that are different between each bit associated with the first timestamp and the second timestamp. In other words, the maximum prefix length is the number of encoded bits that are different up until the point the encoded bits are the same. Using this determination of the maximum prefix length, encoded bits associated with the first and second timestamps are interwoven using a tri-state representation to result in an index value prefix. In some instances and as described throughout this description, the index value prefix may be an encoded hex prefix. The index value prefix is typically shorter in length than the length of the bits associated with the first or second timestamps. Thus, any remaining bits after the index value prefix are padded with zeros (or any other value) to meet the encoded length of the bits of either the first or second timestamps and the resulting encoding may be an index value that can then be used as the key to the generated index for the set of data.

After generating the index and the index values, a request from a user in connection with a computing device may be received to locate log data, the request is parsed to find information indicating a specific time range of log data to query. The bits associated with the specific time range may be encoded and translated to an encoded hex prefix similar to the process described above when generating the key. Once the query request is translated or mapped to a hex encoded prefix, the hex encoded prefix may then be padded to an index value to search the index for log data that are within the time range specified in the query request. The values in the index value may be trimmed and padded with zeros so that broader queries for log data may be generated. After receiving results from these the broader searches, the results may be then further be filtered and/or aggregated together based on a set of predetermined conditions accordingly.

Techniques described herein provide many technical advantages to computing services in a technical environment. For instance, in a virtualized computing environment where multiple computing services are associated with a computing resource service provider, a plurality of log events (e.g., log data) may be created by these computing services. The computing services that generate log data may, in some instances, be offline or experience a power outage for some time (e.g., hours, days, months, etc.). Thereby, log data may be accumulated at the computing service and have yet to be uploaded to a logging service for proper processing. Once a computing service comes back online or becomes connected to a logging service or storage service again, all of these backlogged log data may then be uploaded or sent to the logging service or storage service simultaneously. With the large amount of log data that contain information over a long period of time streamlined into a logging service or storage service all at once, it may be difficult to process, index, and store the log data properly and, consequently, it may also be difficult for a user in connection with a computing device to search and locate log data of a specific time range quickly and efficiently.

Specifically, when large amounts of log data are received, there is no expectation that the ingestion timestamp of a received log event matches the actual generation timestamp of the event. This is particularly important in the monitoring environment as it is important that the service backfills historic events by their generated timestamp. It becomes important to do as such in the instances of network interruptions or batch posting of events as desirable in certain applications such as limiting the number of high power transmit states in mobile and Internet of Things (IoT) industries. This scenario imposes some technical challenges because there is no guarantee that the generated stream of events being produced in near chronological order are properly processed and stored. That is, there lacks an indexing strategy that indexes a collection of events by the full range of timestamps associated with these events. As an example, log data or log events may be sent to a logging service and/or storage service without any system processing besides associating metadata for its storage location. Consequently, when a user (in connection with a computing service or device) sends instructions or a request to locate log data, the user may not be able to quickly and efficiently locate log data due to restrictions in the searching process. As an example, in some query systems, the query request will only search two weeks before and/or two weeks after the specific date that the user indicated. Thus, if a user intends to search a year of log data, the system may have to process at least 12 requests (each request returning 4 weeks of data e.g., 2 weeks before and 2 weeks after the date specified) in order to return the log data in that range. As such, it may be inefficient to generate multiple searches using unnecessarily large amounts of computing processing power to locate log data for a period of one year.

Based on this, techniques of the present disclosure provide for advantageous creation of an index and index values by interweaving the quantized start and end time trimmed to the maximum length quantile that encompasses the start and end date. Specifically, the entirety of the log data that is received at the logging service or storage service may be first subdivided into equal size blocks of predetermined intervals and further stored on a storage device based on a prefix length associated with each block of data. That is, it may be advantageous to create an index for the set of log data having an index value represented by processing the received log data into a collection of smaller events (e.g., chunks) and further process them based on their prefixes as a key for the index locate these chunks. This way, log data stored on a storage device or service may be quickly and efficiently queried when necessary. As a result of this processing, the computing resources to process searching and locating log data may also consequently be reduced and thereby create a more tailored search environment while also improving user experience.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where log data is indexed in accordance with an embodiment. An index may be a set of values that are associated with data storage locations. Additionally, an index value may be one of the values of the set of values stored on an index. In some instances, an index value can also be referred to as an index; however its meaning would be clear from context. In the example illustrated in FIG. 1, one or more services or resources 102 of a computing resource service provider 104 may provide log data 106 to a logging service 108. The log data 106 may be provided from a computing service either automatically based on system policies or may be directed by a customer associated with the one or more services or resources 102. In an embodiment, the services or resources 102 are provided by the computing resource service provider 104 for use by customers of the computing resource service provider 104 both as described below. Each of the services or resources 102 generates log event notifications related to operation of the resource or service so that, for example, errors in operation, security concerns, status updates, and logging of requests from other services or resources, or other such operations are recorded.

It should be noted that, while the examples described herein refer to logging services and log data, other types of streaming data, streaming textual data, non-streaming data, and non-streaming textual data may also be processed using the techniques described herein. In some instances, each log data from a set of log data may be referred to individually as a data item or values from a data item. For example, a corpus of English text from, for example, a collection of books may be similarly indexed and searched using the techniques described herein. It should also be noted that, while the examples described herein are based on a solution to the problem of finding a data item in a collection of data, the techniques described herein may also be used to, for example, gather statistics on the textual data, analyze trends in the textual data, produce reports about the textual data, or other such operations. For example, the processes illustrated below for searching for a data item (i.e., a sought data item) may also be used to search for all occurrences of that data item in the data, thereby producing a frequency count of elements for the sought data item.

For instance, a virtual computer system service may receive a request to instantiate several virtual machine instances on behalf of a customer. When the request is received, a log event notification may be generated indicating the request. Each of the instantiation events for the several virtual machine instances may also cause the generation of one or more additional log event notifications including, but not limited to, log event notifications for instantiation, startup, configuration, application startup, network connection, and connection with other resources. Additionally, other elements associated with those operations (e.g., the network, the applications, the other resources) may generate additional log event notifications. As may be contemplated, the examples of events and operations that may cause log event notifications described herein are merely illustrative examples and other such events and operations that may cause log event notifications may be considered as within the scope of the present disclosure.

The logging service 108 is a service or a computing device provided by a computing resource service provider 104 that receives or obtains the log data 106 and/or log event notifications associated with each entry in the log data 106. The logging service 108 may receive the log data 106 using a direct connection such as, for example, a network connection either via a wired or wireless connection. The logging service 108 may also receive the log data 106 by, for example, interfacing with a separate service, monitoring one or more network addresses, monitoring a storage location, or subscribing to an event notification service. In the example illustrated in FIG. 1, the logging service 108 provides the log data as a stream (referred to herein as a "log data stream") to a log data processing service 112 of the computing resource service provider 104. The log data stream 110 is a stream of log data or other such textual data that is received and processed as it is received. In another embodiment, the log data stream 110 is stored in an intermediate location (e.g., buffer) before being processed by the log data processing service 112. In another embodiment, the log data stream 110 may be first stored in a log data storage device 116 before being sent to the log data processing service 112. The log data storage device 116 may be configured to push or provide log data 106 based on system policies or it may be provided based on a customer's input in connection with other computing devices associated with the computing resource service provider 104. The log data processing service 112 is an example of a textual data processing, which receives any textual data and processes and/or analyzes the data using the techniques described herein.

In the example illustrated in FIG. 1, the logging service 108 also provides the log data 106 for storage in a log data storage service 116, which may be one or more storage locations provided by the computing resource service provider 104. The log data storage service 116 may include the same data as the log data stream 110 or it may include a subset of the data in the log data stream. For example, the log data storage service 116 may include a filtered subset of the log data, or it may include data for a determined time period, or may include some other subset of the log data stream. The log data storage service 116 may be a device configured to store data. In an embodiment, the logging service 114 and the log data storage service may be that of the same service and share the similar configurations. That is, the one or more services or resources 102 may actually send log data 106 directly to the log data storage service 116 which may incorporate the functionalities of the logging service 114, such as, receiving log data 106.

In the example illustrated in FIG. 1, the log data processing service 112 receives the log data in the log data stream 110 and processes the log data 124 before using the processed log data to generate an index 126 or one or more indices. Moreover, log data 124 received by the log data processing service 112 may also be used to generate an index value for the index 126 and every time an index value is generated, the index may update its set of index values using the newly generated index value based on the received log data 124. Specifically, the generated index 126 may be used to search the data for entries 128. Each of these steps is described in greater detail below in connection with FIGS. 4-5. In the example illustrated in FIG. 1, the log data 122 from the log 116 is used by the log data processing service 112 to locate the data from the log data stream 110 that corresponds to keys in the index 126. The index 126 generated may, for example, be a B-Tree index or any other data structure suitable to search data objects.

In an embodiment, the log data processing service 112 may also include functionalities such as using the index and its values to search the log data. The log data processing service 112 may be instructed upon by a user in connection with a computing device (not depicted in FIG. 1) to use the generated index and its values to search for log data. In another embodiment, the index and its values may be generated and stored in the log data storage service 116 or in a separate service in connection with the log data storage service 116.

Although the example illustrated in FIG. 1 illustrates the log data processing service 112 as a separate service from the logging service 108, in an embodiment, the log data processing service 112 may be the same as the logging service 108 and provides the functionality associated with the logging service 108 described herein. In the example illustrated in FIG. 1, the log data received by the logging service 108 includes external log data 118 received from outside of the computing resource service provide environment. The external log data 118 may be from customers associated with computing devices of the computing resource service provider 104, from services, applications, modules, or interfaces hosted outside of the computing resource service provider 104, or from services, applications, modules, or interfaces configured to connect and/or communicate with the services or resources 102 of the computing resource service provide. In an embodiment, the external log data 118 comes from services, applications, modules, or interfaces hosted in an isolated private network (e.g., a virtual private network) hosted by the computing resource service provider 104, but logically isolated from the other services or resources 102 of the computing resource service provider 104.

As further shown in FIG. 1, in an embodiment, the log data from the services 106 and the external log data 120 may first be processed by the log data processing service 112 to generate an index and its values, such that both the log data from services 106 and external log data 120 and the index 126 and its values may in turn be all stored in the log data storage service 116. However, in an embodiment, the log data from services 106 and external log data 120 may also first be stored in the log data storage service 116 before being processed by the log data processing service 112. The log data storage service 116 may be a storage device configured to store data, a buffer, and/or virtual storage hosted by the computing resource service provider 104.

Figure 2:
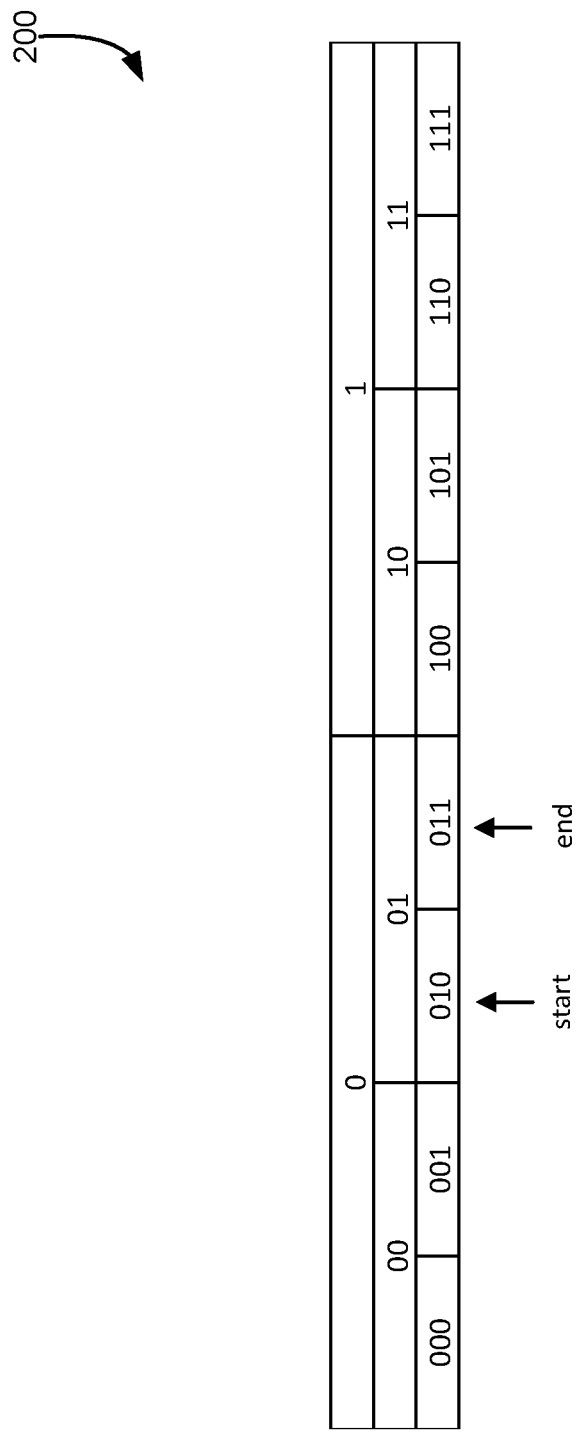
FIG. 2 illustrates a diagram for subdividing an entirety of a set of log data into equal size blocks in accordance with an embodiment.

FIG. 2 illustrates a diagram 200 illustrating decomposing or subdividing an entirety of a set of log data into equal size blocks (e.g., chunks or subsets of the set of data) in accordance with an embodiment. That is, in an embodiment, the received set of log data is first decomposed in its entirety by setting an expected timeline from T+0 to T+~5000 years (or some predetermined time into the future). As shown in the FIG. 2, the T+0 refers to the "0" quadrant and the T+~5000 years is in the "1" quadrant. The timeline is then further split into equal size blocks of approximately $2^{48}$ one-second intervals. That is, as shown in FIG. 2, in an example embodiment, the set of log data can be quantized into equal size blocks based on their timestamps. The timestamps or values indicating timestamps of the received set of log data are compared with one another and recursively compared against the remaining range divided by two where the bits value represents if the timestamp is greater than or less then the mid-point value. For example, bit-0 represents the timestamp being greater than $2^{48}$ seconds from T+0 and bit-1 subdivides the result by checking if the (timestamp-current quantized) value is greater than $2^{47}$ seconds from T+0. This process is recursively repeated to produce a 48-bit binary value for each of the start and end timestamps. This process may be known to those skilled in the art as "chunk indexing" and the assumption is that there is no guarantee of sequential temporal ordering and no guarantee of minimum time range for each given quartile.

As shown in FIG. 2, once the "chunk indexing" is completed, a logging service or a log data processing service in connection with a computing device provided by a computing resource service provider such as one described in connection with FIG. 1 identifies a starting timestamp and an end timestamp in the chunk. For example, a starting timestamp (e.g., the timestamp or data item associated with log data that is the earliest in time) with encoded bits "010" may be determined for one chunk and an end timestamp (e.g., the timestamp or data item associated with log data that is the latest in time) with encoded bits "011" may be determined for that same chunk. Once the logging service or log data processing service identifies the starting timestamp and the end timestamp, and as descried in more detail in connection with FIGS. 4-5, the timestamps may be used to determine an index value (e.g., padded hex encoded prefix) for an index.

Figure 3:
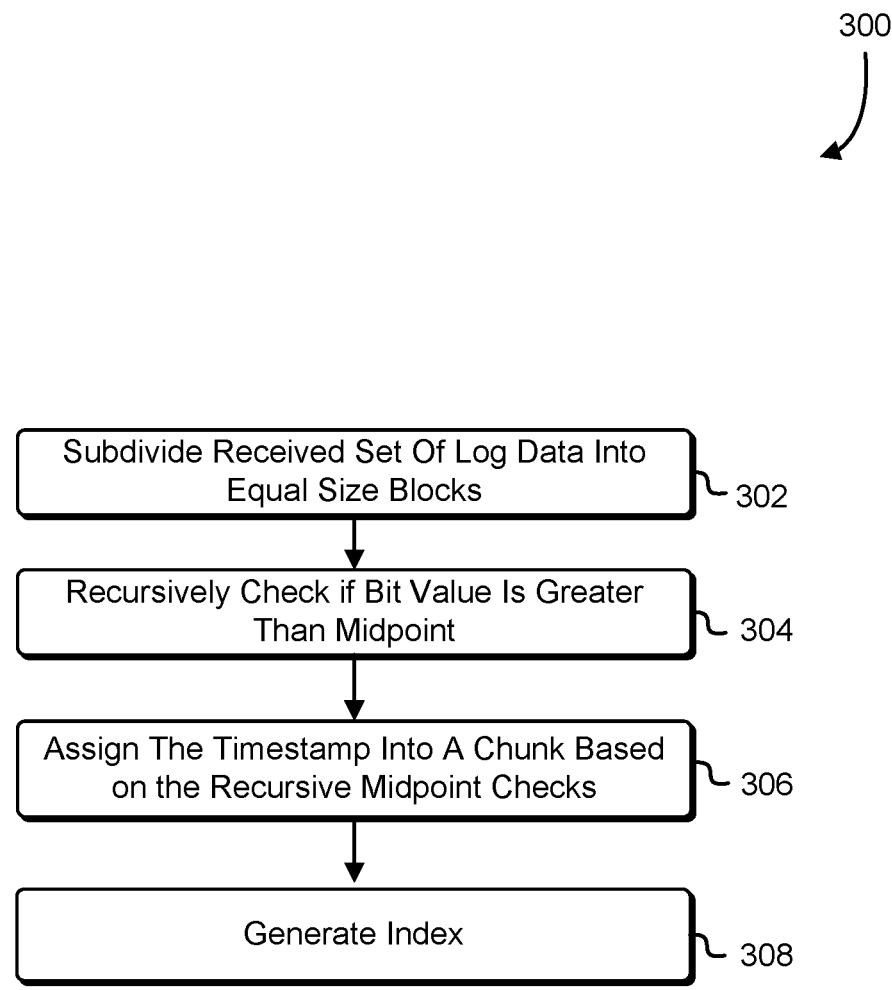
FIG. 3 illustrates a process for subdividing an entirety of a set of log data into equal size blocks in accordance with an embodiment.

FIG. 3 illustrates a flowchart 300 for subdividing an entirety of a set of log data into equal size blocks in accordance with the embodiment as described in connection with FIG. 2. The flowchart 300 may be performed by the logging service associated with a computing device provided by the computing resource provider as described in FIG. 1. That is, the subdivision of a set of data (e.g., chunk indexing) 302 may be performed by comparing the bit value associated with the timestamps of the set of data. The entire set of data may be subdivided into equal parts by recursively comparing 304 the bit values of a timestamp associated with a log data with the midpoint bit value of the entirety of the set of log data. The timestamp, once encoded, may then be assigned or processed according to the quantile (e.g., chunk or subset) that encompasses the timestamp of log data 306. Once log data is assigned to a specific quartile or chunk, the system as described in FIGS. 1-2 above, may take the first timestamp (e.g., earliest timestamp) and a second timestamp (e.g., the latest timestamp) of the log of data in that chunk and generate an index value that can be used to identify the chunk in connection with a generated index 308 accordingly.

Figure 4:
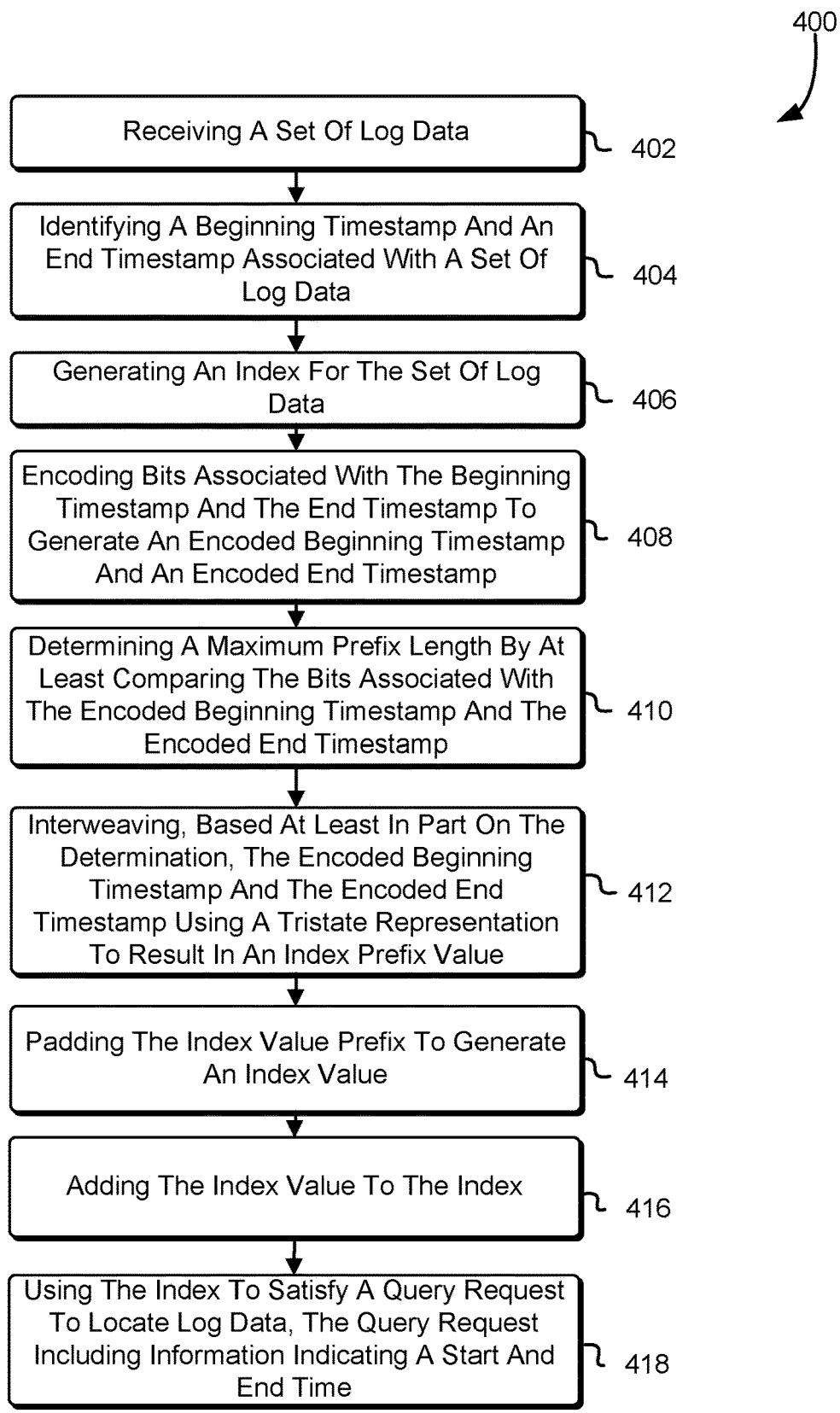
FIG. 4 illustrates a process for generating an index and index values for the set of log data in accordance with an embodiment.

FIG. 4 illustrates a process 400 for generating an index and an index value for the set of log data in accordance with an embodiment. The process 400 may be performed by any suitable entity using hardware, software, or a combination thereof. That is, a logging service in connection with a computing device provided by a computing resource service provider, as described in connection with FIG. 1, may perform process 400.

In FIG. 4 and as further described in connection with FIG. 1, one or more services or resources of a computing resource service provider may provide log data to a logging service 402. Each of the one or more computing services or resources generates log event notifications related to operations of the resource or service so that, for example, errors in operation, security concerns, status updates, and logging of requests from other services or resources, or other such operations are recorded. In other words, the log event notifications (e.g., log data) generated by one or more computing services or resources may be received by a logging service. In some instances, the log data may be uploaded or sent to the logging service instantaneously after the log data is generated by the computing service. However, in some embodiments, the log data may be generated at the computing services and fail to upload or send to the logging service for a certain period of time. As an example, log data at a computing service may be generated but the computing service is offline or disconnected from other services (e.g., logging service) associated with the computer resource service provider. Hence, log data may be backed-up for some time while the computing service is offline. In some instances, the log data may be backed-up or yet to be sent to the logging service over at time period of many years. Once the computing service is back online, however, the log data may then be sent to a logging service for processing.

As further shown in FIG. 4, the logging service is a service that receives the log data and/or log event notifications associated with each entry in the log data. The logging service may receive the log data using a direct connection such as, for example, a network connection either via a wired or wireless connection. The logging service may also receive the log data by, for example, interfacing with a separate service, monitoring one or more network addresses, monitoring a storage location, or subscribing to an event notification service. The logging service may provide the log data as a stream (referred to herein as a "log data stream") to a log data processing service of the computing resource service provider. The log data stream is a continuous stream of log data or other such textual data that is received and processed as it is received.

In 404, once received, the logging service may identify values, sequence numbers, alphanumeric identifiers, and/or timestamps associated with a set of log data. As an example, a set of data may have log event timestamps as follows:
//Input(Chunk): Events Timestamps→
    Event 1: 1496427525604,
    Event 2: 1496427625604,
    Event 3: 1496427725604,
    . . .
    Event N: 1496427535904

A first timestamp associated with the subset of the set of log data may be the earliest generated log data in the subset of the set of log data and a second timestamp associated with the subset of the set of log data may be the latest generated log data in the subset of the set of log data. In other words, the timestamps identified for a chunk of log data may include the beginning timestamp (e.g., earliest in time) and an end timestamp (e.g., latest in time). In some instances, the first timestamp may not be the earliest timestamp but rather a specific timestamp and the second timestamp may not be the latest timestamp but rather a specific timestamp generated at a time after the first timestamp. The timestamps that are associated with the log data refer to the time that the logs were generated at the computing service. Once both the beginning timestamp and the end timestamps are identified for the chunk, an index for that chunk may be generated 406 accordingly.

In 408, in an embodiment, a logging service may send the log data stream to a log data processing service to generate the index and its values. That is, the earliest and latest timestamps associated with the chunk are identified and bits associated with the beginning timestamp and the end timestamp are encoded to generate an encoded beginning timestamp and an encoded end timestamp. For example, the earliest and latest timestamps in a chunk may be identified as follows:
//Fetch earliest and latest timestamps→
Start: 1496427525604
End: 1496427535904
Once the earliest and latest timestamps are identified, the timestamps may be encoded as follows:
//Encode start and end timestamp
1496427525604→00000001010111000110101000001-11111010111100011
1496427535904→1111111010100011100101011111011-11110000111011111

In 410, the logging service may determine a maximum prefix length by at least comparing the bits associated with the encoded beginning timestamp and the encoded end timestamp. In some embodiments, other lengths may be determined instead of the maximum prefix length. For example, the maximum prefix length may be predetermined or set by the logging service. That is, each bit for the starting timestamp is compared with each bit for the end timestamp and the max amount of encoded bits that are different is determined. For example, the maximum prefix length for the start and end timestamps of "1496427525604" and "1496427535904" would be 28-bits:

//Determine encoded prefix length (max bits where s[i] !=e[i]) up to a max of 48-bits
//s[i] refers to the bit value relative to the position of the starting timestamp, and e[i] refers to the bit value relative to the position of the end timestamp.
//s[i] !=e[i]→refers to a position where the starting timestamp has a bit value different than the end timestamp's bit value.
00000001010111000110101000000111111010111100-011→11111110101000111001010111101111110000-111011111=28-bits In 412, the logging service interweaves the first 28-bits of the encoded bits associated with the starting and end timestamps. That is, the encoded bits are interwoven based at least in part on the determination that the maximum prefix length is 28-bits. The encoded beginning timestamp and the encoded end timestamp are interwoven using a tristate representation to generate an index prefix value for the index as follows:

//Encoded as two bits per encoded bit
//Using the two bits to represent a tri-state (1,0,Z)
//If first bit is low then Z, otherwise second bit is value
//Start and end bits are inter-weaved to allow for proximity in the index
//The mapping for tri-state is as follows: 1→11, 0→10, Z→01 or 00
//Interweave first 28 bits of start and end time to 56 bit tri-state
01110111011101110111011101111101011111101011111-01110111010111011101111101110101111101011111-010111011011101110111

Moreover, in 412, after the encoded beginning timestamp and the encoded end timestamp are interwoven, the resulting interwoven encoded bits may then be translated or mapped to an index value prefix, such as a hex encoded prefix using hex encoding. For example, the hex encoded prefix for the 56-bit tri-state "01110111011101110111011101111101011111101011110-1110111010111011101111101110101111101011111011-10111011101110111" may be generated as follows:

//Hex encode resultant prefix
EEEEEEEBEBEBBBEEEBBEBEBEEEE

In 414, the hex encoded prefix may then be padded with zeros (or other variables or values) up to a predetermined length. That is, the predetermined length may be the number of bits used in the generated index. In an embodiment, the predetermined length may also be the length of the encoded beginning timestamp or the encoded end timestamp to generate an index value as follows:

//Pad to max length (48-bits)
EEEEEEEBEBEBBBEEEBBEBEBEEEE00000000-00000000000

Moreover, in 416, the padded index value may then be stored or added in a B-Tree in connection with a storage device provided by the computing resource service provider. The index may, for example, be a B-Tree index or any other tree-based data structure suitable to search data objects.

In 418, the index is then used to satisfy a query request to locate log data, the query request including information indicating a start and an end time that are used to generate an index value. The index value may then be used to query the index for the data. The query request may be sent from a user in connection with a computing service seeking to locate log data for a specific time range.

Figure 5:
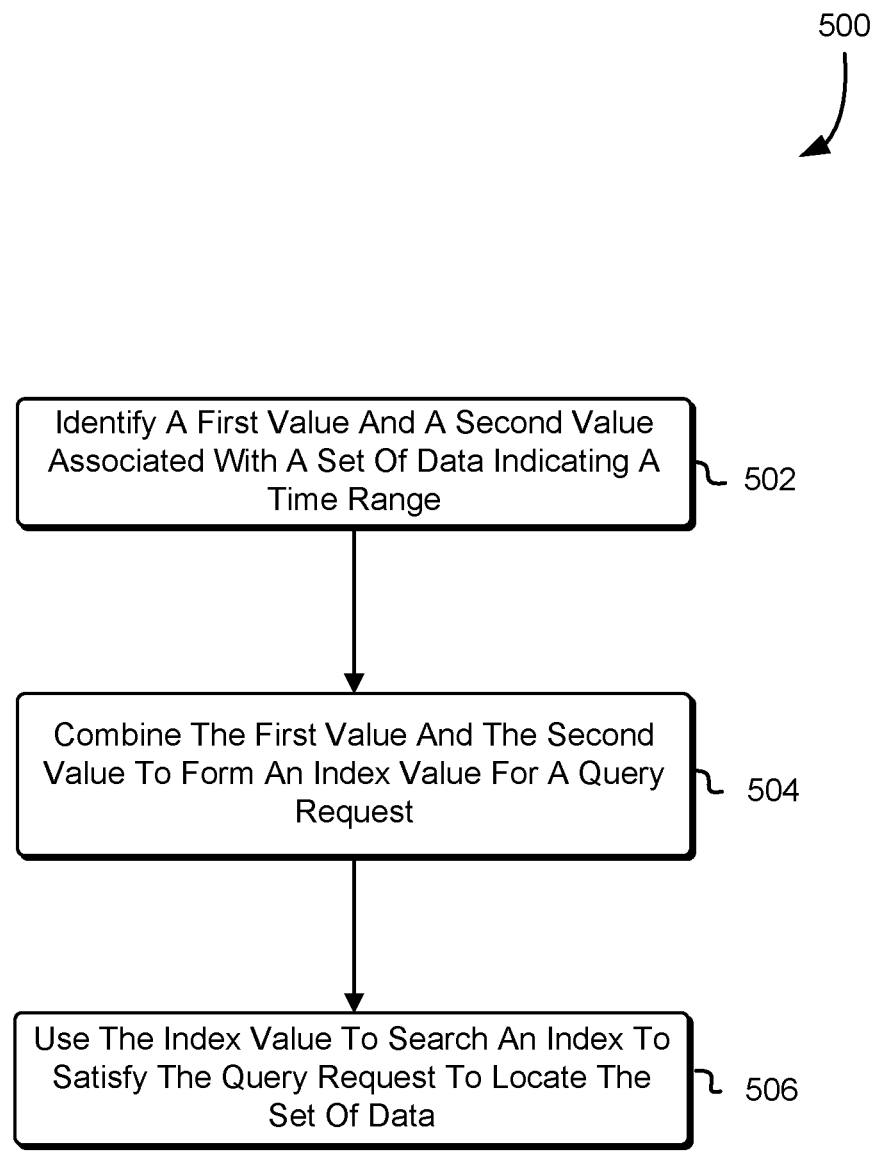
FIG. 5 illustrates a process for querying the index and determining a subset of the set of log data that are inclusive in a queried time range in accordance with an embodiment.

FIG. 5 illustrates a process 500 for querying the index and determining a set of log data that are inclusive in a queried time range in accordance with an embodiment. The process 500 may be performed by the logging service associated with a computing device provided by the computing resource service provider as described in FIG. 1. In 502, the logging service identifies values associated with a set of data indicating a time range. Specifically, in one instance, the logging service may identify a first timestamp and a second timestamp associated with a set of log data. The first and second timestamps may be identified based on a query request sent from a user in connection with a computing service provided by the computing resource provider, as described in FIG. 1, or a separate device disassociated with the computing resource service provider. In other words, the query request may specify a time range (e.g., Apr. 10, 2017 at 08:00:00 PST to Apr. 13, 2017 at 08:00:00 PST) of log data to locate. For example, a query request may include a first timestamp and a second timestamp, which may be represented as follows:

Start: 1520872191000
End: 1520872461000

In 504, the bits associated with the first timestamp and the second timestamp are encoded to generate an encoded first timestamp and an encoded second timestamp. Once encoded, the bits of the first timestamp and the second timestamp may be combined or interweaved. Combining the bits of the first timestamp and second timestamp may, in some instances, simply mean concatenating the bits of the first timestamp and second timestamp together. However, in the context of this description, combining the bits means taking a first bit in the first position of the first timestamp, then adding the first bit in the first position of the second timestamp, then adding the second bit in the second position of the first timestamp, then adding the second bit in the second position of the second timestamp . . . , etc. Similar to the process described in connection with FIG. 4, the encoded start and end timestamps may be represented as an index value represented in bits such as "0" and "1"'s up to a maximum 48-bit value. The maximum 48-bit value is provided as one illustrative example, however, different embodiments may have different lengths. That is, in some instances, the maximum bit value length may be shorter or longer than 48-bits described herein.

When the start and end times are encoded, the logging service may determine a maximum prefix length by at least comparing the bits associated with the encoded first timestamp and the encoded second timestamp. The comparison is performed by iteratively checking each of the bits associated with first and second timestamps to determine the number of bits that differ. The iterative process ends when each of the bits associated with the encoded first timestamp and the encoded second timestamp is the same. The maximum prefix length where each of the bits differ, for instance, can be 20-bit in length, 28-bits in length, or as many as 48-bits in length.

Subsequently, the encoded bits associated with the first and second timestamps are interwoven using a tri-state representation and a mapping of the interweaved encoded first timestamp and the encoded second timestamp to a hex encoded prefix may then occur. For example, the hex encoded prefix for the start time "1520872191000" and end time "1520872461000" may be as follows:

EEEEEEEBEBBEEEBEEEEBBEBBEEE

When the hex encoded prefix is determined, the last prefix may then be removed and padded with a zero. This process may be repeated (or performed recursively) until the first prefix remains with the rest of prefix padded with zeros. Padding the end of a prefix with zeros is an example embodiment described herein, however, there may be some instances where the rest of the prefix may be padded with values other than zero to generate the index value. In 506, this process would provide a user in connection with a computing device with an index to use in order to search all the log data that falls within the time range (e.g., represented by an index value) specified in the query request. The user in connection with a computing device may then elect to further filter and/or aggregate the results of the query request accordingly. This process is described in further detail in connection with FIG. 6.

As a result, on the query side, any B-Tree implementation can then be queried for the concatenated results of prefix searches padded to the max length encoded query time range. The end result gives a single B-Tree index that can be queried for all record collections that are inclusive to the queried time range with an upper bounded number of distinct concatenated queries dependent on the desired resolution.

Figure 6:
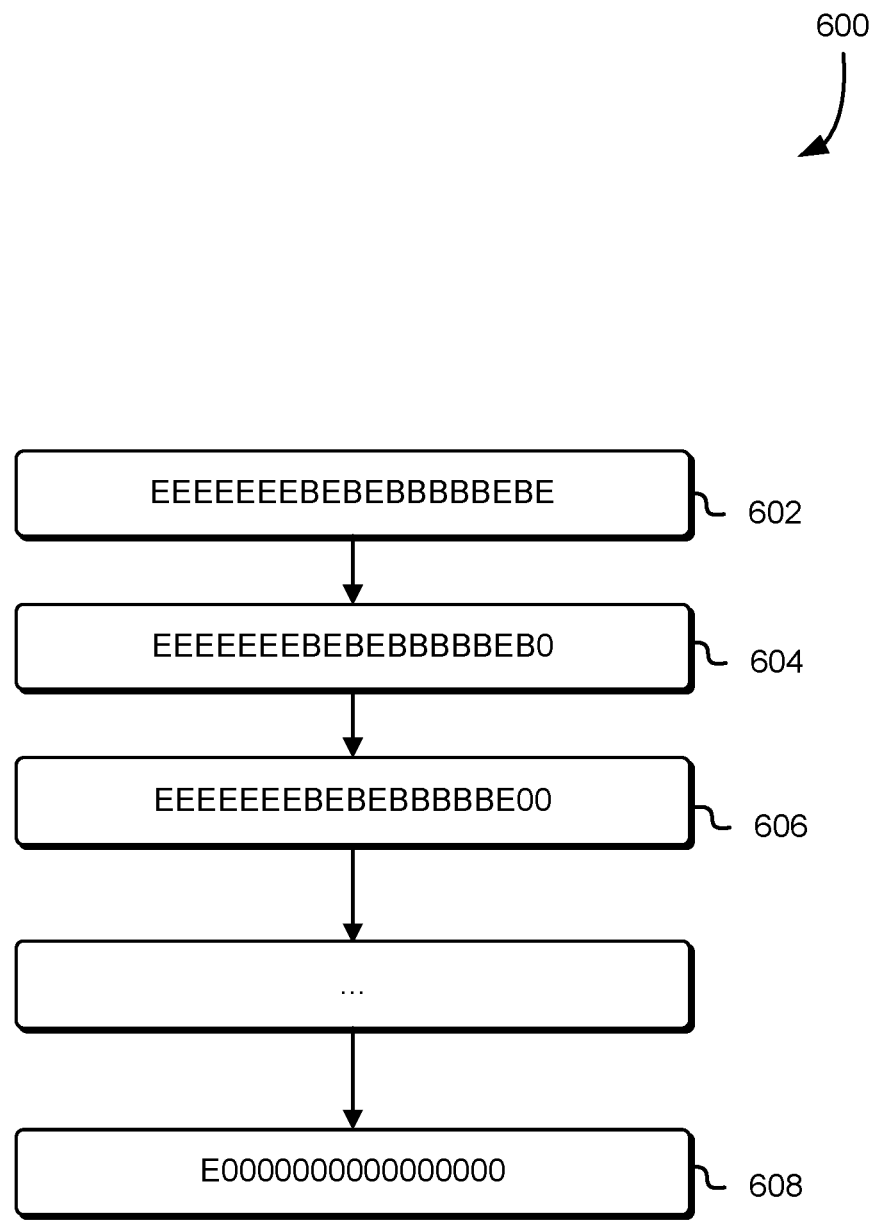
FIG. 6 shows multiple prefix determinations based on a time range in accordance with an embodiment.

FIG. 6 illustrates multiple prefix determinations based on a time range received from a query request in accordance with an embodiment. After a query request is received from a user associated or in connection with a computing device, the query request is used to determine a starting and end time range that the user in connection with a computing device seeks to locate in log data. The starting and end times are then encoded and further processed to generate an encoded hex prefix according to the embodiment as described in connected with FIG. 4. That is, the query request includes information about a specific time range a user in connection with a computing device is looking to locate in an index. The starting time is encoded and the end time is encoded by encoding bits associated with the first timestamp and the second timestamp to generate an encoded first timestamp and an encoded second timestamp. Moreover, a determination for a maximum prefix length is made by at least comparing the bits associated with the encoded first timestamp and the encoded second timestamp. Furthermore, the encoded bits may be interwoven, concatenated, or combined, based at least in part on the determination, using a tristate representation. In an embodiment, a mapping may be performed to the interweaved encoded first timestamp and the encoded second timestamp using hex encoding to generate a hex encoded prefix 602 and then an index value accordingly. The index value may then be used to search an index to satisfy the query request to locate the set of log data. Moreover, the index value may delete or drop off the last prefix and pad the prefix with a zero 604 to locate additional log data in that range. This may be performed recursively or repeatedly until the prefix is padded with remaining zeros 606, 608 and used as the key to search the index for all the log data in this given range.

Once all the log data have been identified based on the hex encoded prefix, a concatenated list of all results for the queried prefix may be generated and a user in connection with a computing device may determine how to post-process or filter the results.

Figure 7:
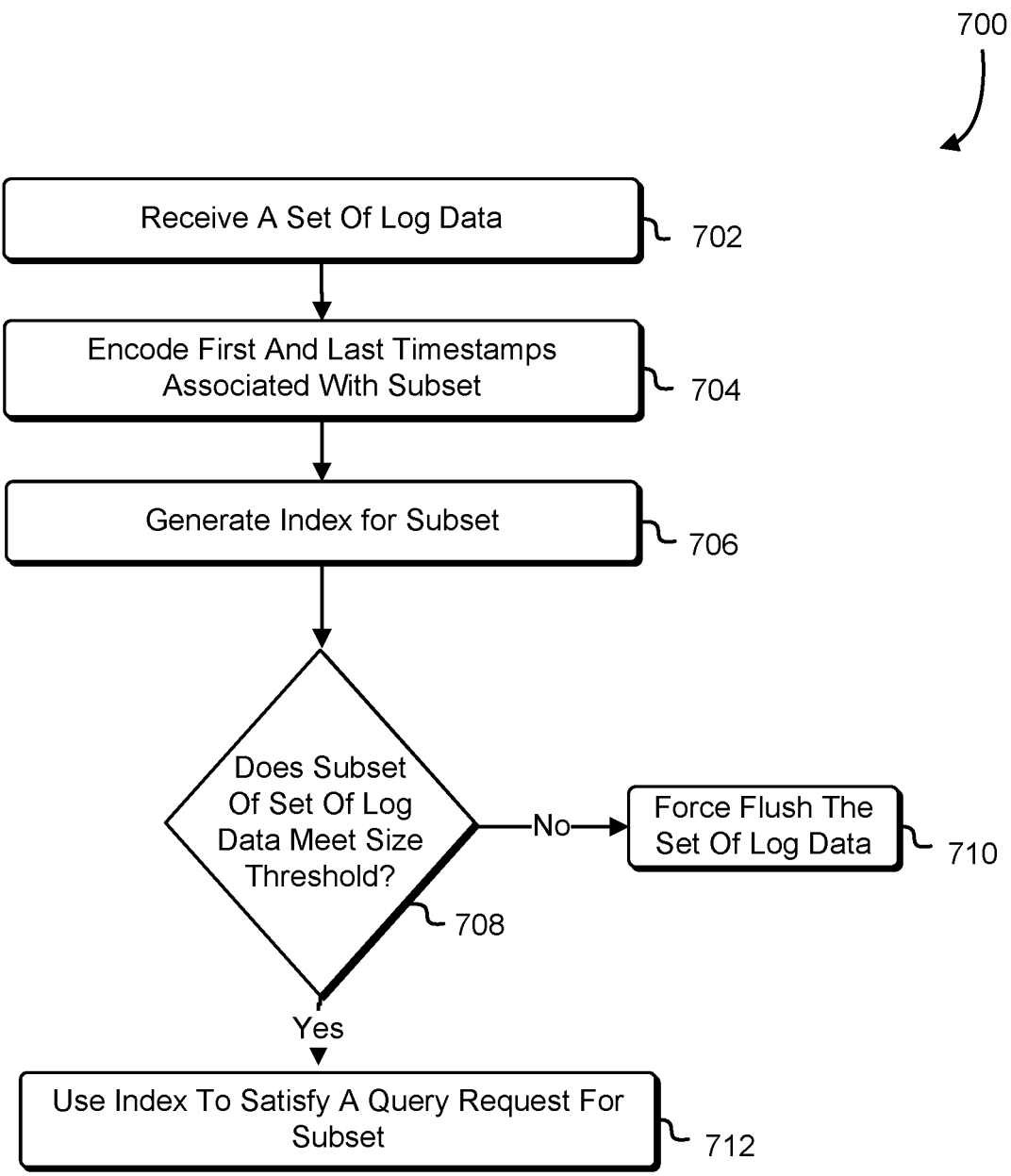
FIG. 7 illustrates a process for force flushing a set of log data in accordance with an embodiment.

FIG. 7 illustrates a process for force flushing a set of log data in accordance with an embodiment. The system as described in accordance with FIG. 1 may receive a set of log data 702 and a determination may be made as to whether a subset of the set of log data (e.g., chunk) meets a predetermined threshold size. In other words, based on system-defined or user-defined policies, a predetermined threshold size of 30 Megabytes (MB) may be set for each of the chunks. A monitoring service may be utilized to monitor the size of the subset of the log data for a duration of time. The monitoring service may, for example, determine whether the size of the subset of the log data meets a certain threshold within a timeframe (e.g., six hours). If the size of the subset of the log data does not exceed the size threshold (e.g., 30 MB) during the timeframe, the system may force flush the subset of the set of log data. Force flushing the subset of the data may, for example, be moving the subset of the data to another disk or buffer. If the size of the subset of the log data does exceed the size threshold, then the system may continue on to use the index.

That is, as illustrated in FIG. 7, the system may generate an index for the subset of the set of log data similar to the process discussed in FIG. 4. That is, the bits associated with the timestamps of the subset of the set of log data may be encoded 704 and further mapped as an encoded hex prefix or simply known as an index value prefix. Once the encoded hex prefix is mapped, zeros may be added or padded to the end of it such that it matches a predetermined length or the length of the encoded timestamp to generate an index value. For example, an encoded start and end timestamp may each be 48-bits long. The encoded hex prefix may then be padded to generate an index value that is also 48 bits long and used as a key for the generated index 716. The subset of the set of log data may be monitored to determine if the subset of the set of data meets a size threshold 708 and whether a force flush 710 is necessary. If not, then the system may continue to use the subset of the set of data associated with the generated index 712 to satisfy query requests. The subset of the set of log data along with the index and its values may also be stored in a storage device. The storage device may be provided by a storage service that is associated with a computing resource service provider.

Subsequently, once a request is received by a computing device provided by the computing resource service provider to locate log data, the key associated with the index may be used 714 to satisfy a query request. That is, the request may be generated by a user using a computing device or service hosted by the computing resource service provider or simply by a configuration determined by the system where the system is predetermined to perform searches for a specific time range of log data. The storage device may be queried by using the information indicative of a time range associated with the query request. Once the time range is identified, a prefix associated with that time range may be identified and in connection with the previously generated indexed, log data may be located.

Figure 8:
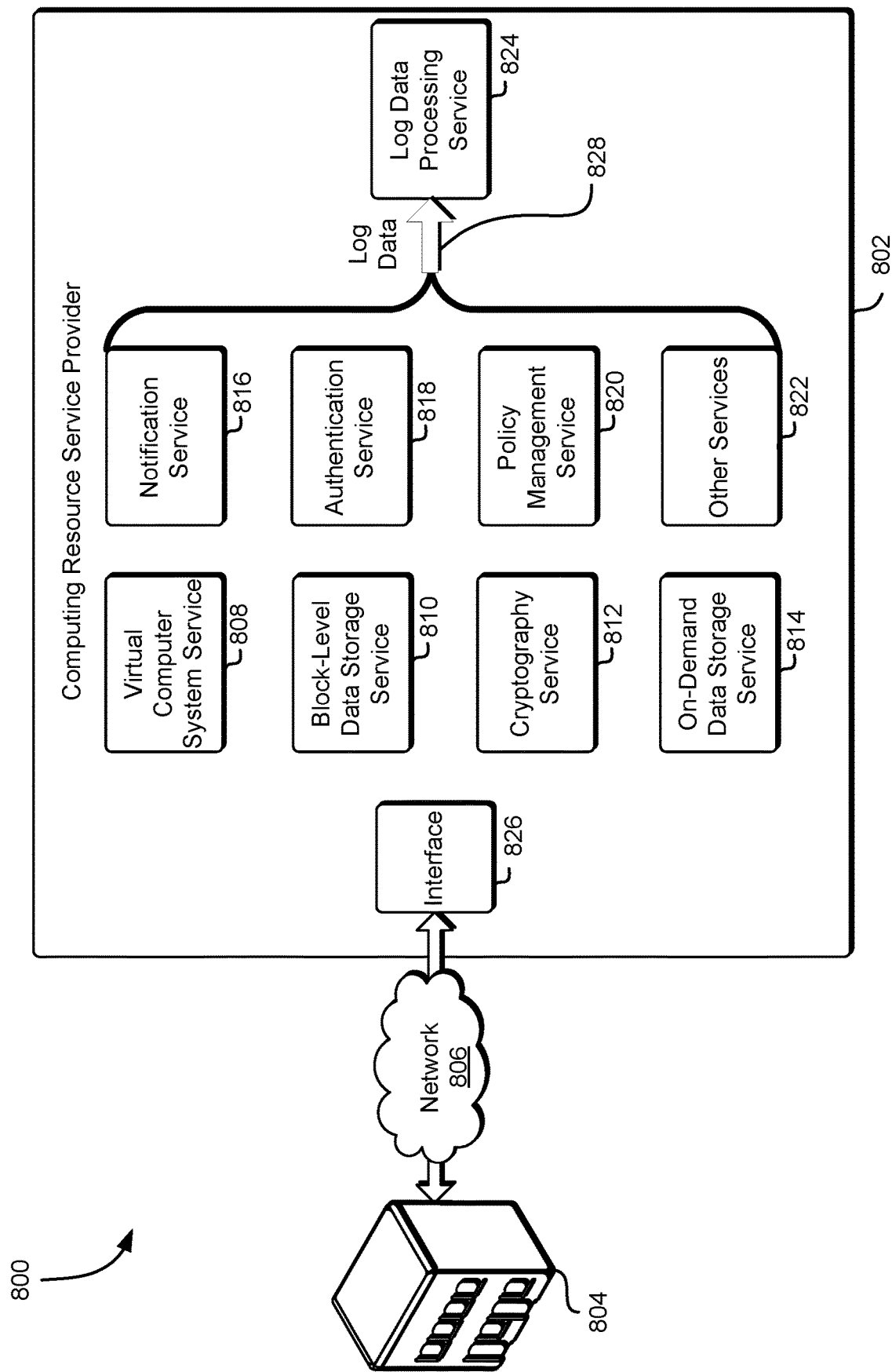
FIG. 8 illustrates an example environment where various services of a computing resource service provider generate log data that may be indexed in accordance with an embodiment.

FIG. 8 illustrates an example environment 800 where various services of a computing resource service provider generate log data that is indexed, as described in connection with FIG. 1, and in accordance with at least one embodiment. The computing resource service provider 802 may provide a variety of services to the customer 804 and the customer 804 may communicate with the computing resource service provider 802 via an interface 826, which may be a web services interface or any other type of customer interface. While the example environment illustrated in FIG. 8 shows one interface 826 for the services of the computing resource service provider 802, each service may have its own interface and, generally, subsets of the services may have corresponding interfaces in addition to or as an alternative to the interface 826. Each of the services illustrated in FIG. 8 may communicate with a log data processing service 824 and may provide log data 828 and/or other such textual data to the log data processing service 824 as described herein.

The customer 804 may be an organization that may utilize one or more of the services provided by the computing resource service provider 802. Additionally, the customer 804 may be an individual that utilizes the services of the computing resource service provider 802. As shown in FIG. 8, the customer 804 may communicate with the computing resource service provider 802 using a network 806, wherein the network 806 may be a communication network, such as the Internet, an intranet or an Internet service provider (ISP) network such as those described herein.

The computing resource service provider 802 may provide various computing resource services to its customers. The services provided by the computing resource service provider 802, in this example, may include a virtual computer system service 808, a block-level data storage service 810, a cryptography service 812, an on-demand data storage service 814, a notification service 816, an authentication service 818, a policy management service 820, and one or more other services 822. Not all embodiments described may include the services described with reference to FIG. 8 and additional services may be provided in addition to or as an alternative to services explicitly described. As described, each of the services 808 through 822 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block-level data storage service 810). As described above, each of these services may communicate with a log data processing service 824 and may provide log data 828 and/or other such textual data to the log data processing service 824 as described herein. Using the example above, the virtual computer system of the virtual computer system service 808 generate log entry events associated with the operations to store data in or retrieve data from the on-demand data storage service 814 or to access one or more block-level data storage devices provided by the block-level data storage service 810.

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems and/or the virtual computer system service 808 may provide log data 828 the log data processing service 824 such as, for example, log data relating to startup, shutdown, errors, and other such virtual machine operations. This log data may then be used to generate the index. The virtual computer systems of the virtual computer system service 808 may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. The block-level storage devices and/or the block-level data storage service 810 may provide log data 828 the log data processing service 824 related to the operation of the block-level storage devices and/or to the block-level storage service so that log data may be used to generate the index which may, in turn, be used to search for log entries in the log data using the index. A block-level storage device may enable the persistent storage of data used/generated by a corresponding virtual computer system where the virtual computer system service 808 may only provide ephemeral data storage.

The computing resource service provider 802 may also provide a cryptography service 812. The cryptography service 812 may generate cryptographic keys for use within the system and may, in an embodiment, utilize one or more storage services of the computing resource service provider 802 to store keys of the customers in encrypted form, whereby the keys may be usable to decrypt customer 804 keys accessible only to particular devices of the cryptography service 812. The cryptography service 812 may provide log data 828 the log data processing service 824 so that log data related to, for example, generating and storing such keys may be used to generate the index of the log data as described herein. The block-level storage devices and/or the block-level data storage service 810 may provide additional log data 828 to the log data processing service 824 related to storing such keys that may be used to generate the index of the log data.

The computing resource service provider 802 further includes an on-demand data storage service 814. The on-demand data storage service 814 may be a collection of computing resources configured to synchronously process requests to store and/or access data. As with the above services, the on-demand data storage service 814 may generate log data 828 related to, for example, the operation of the on-demand data storage service 814 which may be used to generate the index as described herein. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects that may be used by the customer 804 to retrieve or perform other operations in connection with the data objects stored by the on-demand data storage service 814. Each of these operations may generate additional log data 828 which may be used by the log data processing service 824 to generate the index as described herein.

In the environment illustrated in FIG. 8, a notification service 816 is included. The notification service 816 may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to check periodically or "poll" for new information and updates. The notification service 816 may further be used for various purposes such as monitoring applications executing in the virtual computer system service 808, workflow systems, time-sensitive information updates, mobile applications, and many others. As with the previously described services, the notification service 816 may provide log data 828 to the log data processing service 824 is used to generate the index of the log data.

As illustrated in FIG. 8, the computing resource service provider 802, in various embodiments, includes an authentication service 818 and a policy management service 820. The authentication service 818, in an embodiment, is a computer system (i.e., collection of computing resources) configured to perform operations involved in authentication of users of the customer. For instance, one of the services 808 through 816 and/or 820 through 822 may provide information from a user to the authentication service 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change, or otherwise modify policy for a customer or for other administrative actions, such as providing an inventory of existing policies and the like. The authentication service 818 and/or the policy management service 820 may also provide log data 828 to the log data processing service 824 that is used to generate the index of the log data.

The computing resource service provider 802 additionally maintains one or more other services 822 based at least in part on the needs of its customers 804. For instance, the computing resource service provider 802 may maintain a database service for its customers 804. A database service may be a collection of computing resources that collectively operate to run one or more databases for one or more customers. The customer 804 may operate and manage a database from the database service by utilizing appropriately configured API calls. This, in turn, may allow a customer 804 to maintain and potentially scale the operations in the database. Other services 822 may include, but may not be limited to, object-level archival data storage services and services that manage and/or monitor other services. Each of these other services 822 may also provide log data 828 to the log data processing service 824 that is used to generate the index of the log data as described herein.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
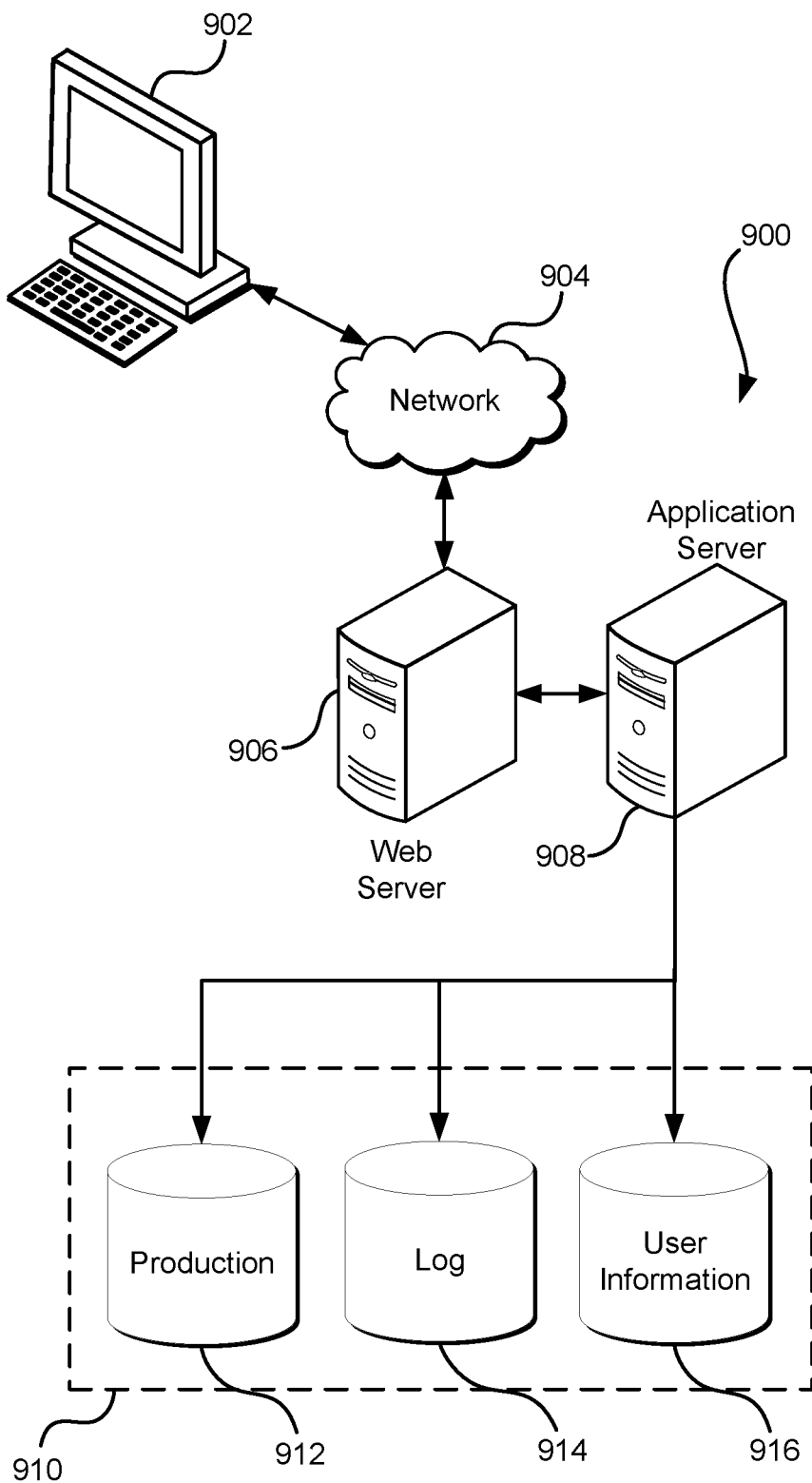
FIG. 9 illustrates an environment in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular, or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network, and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually, and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 912 and user information 98, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update, or otherwise process data in response thereto and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols, such as UDP, that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these, and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

(i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a set of log data;
   identifying a beginning timestamp and an end timestamp associated with the set of log data;
   generating an index for the set of log data by at least:
   encoding bits associated with the beginning timestamp to generate an encoded beginning timestamp and encoding the end timestamp to generate an encoded end timestamp;
   determining a maximum prefix length between the encoded beginning timestamp and the encoded end timestamp, wherein the determination is performed by at least comparing the bits associated with the encoded beginning timestamp and the encoded end timestamp;
   interweaving, based at least in part on the determination, the encoded beginning timestamp and the encoded end timestamp using a tristate representation to result in an index value prefix;

padding the index value prefix to generate an index value; and adding the index value to the index; and using the index to satisfy a query request to locate log data, the query request including information indicating a start and an end time.

2. The computer-implemented method of claim 1, wherein the set of log data are obtained from one or more computing services operated by a computer resource service provider.

3. The computer-implemented method of claim 1, wherein the index value prefix is encoded, using hex encoding, to a hex encoded prefix.

4. The computer-implemented method of claim 1, further comprising:

comparing a size of the set of log data is compared against a threshold; and in response to the size of the set of log data not exceeding the threshold, force flushing the set of log data.

5. A system, comprising:

one or more processors; and memory that stores computer-executable instructions that, as a result of being executed, cause the one or more processors to:

identify a first data item and a second data item associated with a set of data indicating a range for items of the set of data;

generate an index for the set of data by at least:

obtaining a first value of the first data item and a second value of the second data item;

determining a maximum prefix length between encoded bits representing the first value and encoded bits representing the second value; and combining the first value and the second value, based at least in part on the determination, by at least interweaving the encoded bits representing the first value and encoded bits representing the second value using a tristate representation to form an index value; and update the index to associate the index value with a set of data that comprises the first data item and the second data item.

6. The system of claim 5, wherein the first value and second value are timestamps.

7. The system of claim 5, wherein the first value and second value indicate, respectively, a position of the first data item and second data item in the set of data.

8. The system of claim 7, wherein the first value and second value, respectively, correspond to an earliest data item and latest data item in a time-based ordering of the set of data.

9. The system of claim 5, wherein combining the first data item and second data item include interweaving a set of respective bits associated with the first data item and second data item, wherein the set of respective bits is equal to the amount of bits of the maximum prefix length.

10. The system of claim 5, wherein the instructions further comprise computer-executable instructions that, as a result of being executed by the one or more processors, cause the system to pad the index value.

11. The system of claim 10, wherein the index value is padded to a length of encoded bits representing the first value or a length of encoded bits representing the second value.

12. The system of claim 5, wherein the index is a B-Tree index.

13. A non-transitory computer-readable storage medium comprising executable instructions that, as a result of being executed by one or more processors of a computer system, cause the computer system to at least:

identify a first value and a second value associated with a set of data indicating a range for items of the set of data;

generate an index for the set of data by at least:

determining a maximum prefix length between encoded bits representing the first value and encoded bits representing the second value; and combine the first value and the second value based on the length of bits associated with the maximum prefix length, by at least interweaving encoded bits representing the first value and encoded bits representing the second value using a tristate representation, to form an index value for a query request; and use the index value to search an index to satisfy the query request to locate a set of data.

14. The non-transitory computer-readable storage medium of claim 13, wherein the instructions further comprise instructions that, as a result of being executed by the one or more processors, cause the computer system to recursively generate the index value by removing the last value of the index value and padding a value such that all data in a time range are identified.

15. The non-transitory computer-readable storage medium of claim 14, wherein the instructions further comprise instructions that, as a result of being executed by the one or more processors, cause the computer system to perform one or more modifications to the data, wherein the one or more modification includes aggregating the data.

16. The non-transitory computer-readable storage medium of claim 13, wherein the first value indicates a first time and second value indicates a second time.

17. The non-transitory computer-readable storage medium of claim 16, wherein first value includes a timestamp indicating an earliest value and the second value includes a timestamps indicating a latest value in a time-based ordering set of data.

18. The non-transitory computer-readable storage medium of claim 13, wherein the index is a tree-based index.

19. The non-transitory computer-readable storage medium of claim 13, wherein the index value is generated by at least obtaining the first value indicating earliest in time and the second value indicating latest in time from the query request.

20. The non-transitory computer-readable storage medium of claim 13, wherein combining the first value and the second value to form an index value for a query request further comprise instructions that, as a result of being executed by the one or more processors, cause the computer system to interweave the encoded bits starting from a first position of the first value and encoded bits starting from a first position of the second value.

* * * * *